(12) United States Patent
Takao

(10) Patent No.: US 8,477,249 B2
(45) Date of Patent: Jul. 2, 2013

(54) TELEVISION RECEIVER AND ELECTRONIC DEVICE

(75) Inventor: Mitsuyoshi Takao, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/448,860

(22) Filed: Apr. 17, 2012

(65) Prior Publication Data

US 2013/0057124 A1  Mar. 7, 2013

(30) Foreign Application Priority Data

Sep. 1, 2011 (JP) .................................. 2011-191123

(51) Int. Cl.
*H04N 5/72* (2006.01)

(52) U.S. Cl.
USPC ......................................................... 348/831

(58) Field of Classification Search
USPC ......................................................... 348/831
See application file for complete search history.

(56) References Cited

U.S. PATENT DOCUMENTS

2008/0006748 A1  1/2008  Watanabe et al.

FOREIGN PATENT DOCUMENTS

| JP | 09-214817 | 8/1997 |
|----|-----------|--------|
| JP | 2004-304679 | 10/2004 |
| JP | 2005-337484 | 12/2005 |
| JP | 2008-014472 | 1/2008 |
| JP | 2008-294793 | 12/2008 |
| JP | 2010-250245 | 11/2010 |

OTHER PUBLICATIONS

Japanese Patent Application No. 2011-191123; Decision to Grant a Patent; Mailed Aug. 7, 2012 (with English translation).

*Primary Examiner* — David Czekaj
*Assistant Examiner* — Tracy Li
(74) *Attorney, Agent, or Firm* — Blakely, Sokoloff, Taylor & Zafman LLP

(57) ABSTRACT

According to one embodiment, a television receiver includes a housing, a support portion, a first movable portion, and a second movable portion. The first movable portion includes a sliding portion supported by one of the housing and the support portion to be rotatable in at least two directions. The second movable portion rotates in a first rotation direction with the first movable portion, and includes a second sliding portion, a first engagement portion, and a second engagement portion. The second sliding portion is supported by the one of the housing and the support portion to be rotatable in the first rotation direction. The first engagement portion engages with the one of the housing and the support portion to limit a rotation range in the first rotation direction. The second engagement portion engages with the first movable portion to limit a rotation range in a second rotation direction.

10 Claims, 16 Drawing Sheets

TELEVISION RECEIVER AND ELECTRONIC DEVICE

CROSS-REFERENCE TO RELATED APPLICATIONS

This application is based upon and claims the benefit of priority from Japanese Patent Application No. 2011-191123, filed Sep. 1, 2011, the entire contents of which are incorporated herein by reference.

FIELD

Embodiments described herein relate generally to a television receiver and an electronic device.

BACKGROUND

There have been known television (TV) receivers and electronic devices having a display device the display screen of which can be set at different angles.

If the angle of the display screen can be freely set in various directions, TV receivers and electronic devices of this type may be difficult to use.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
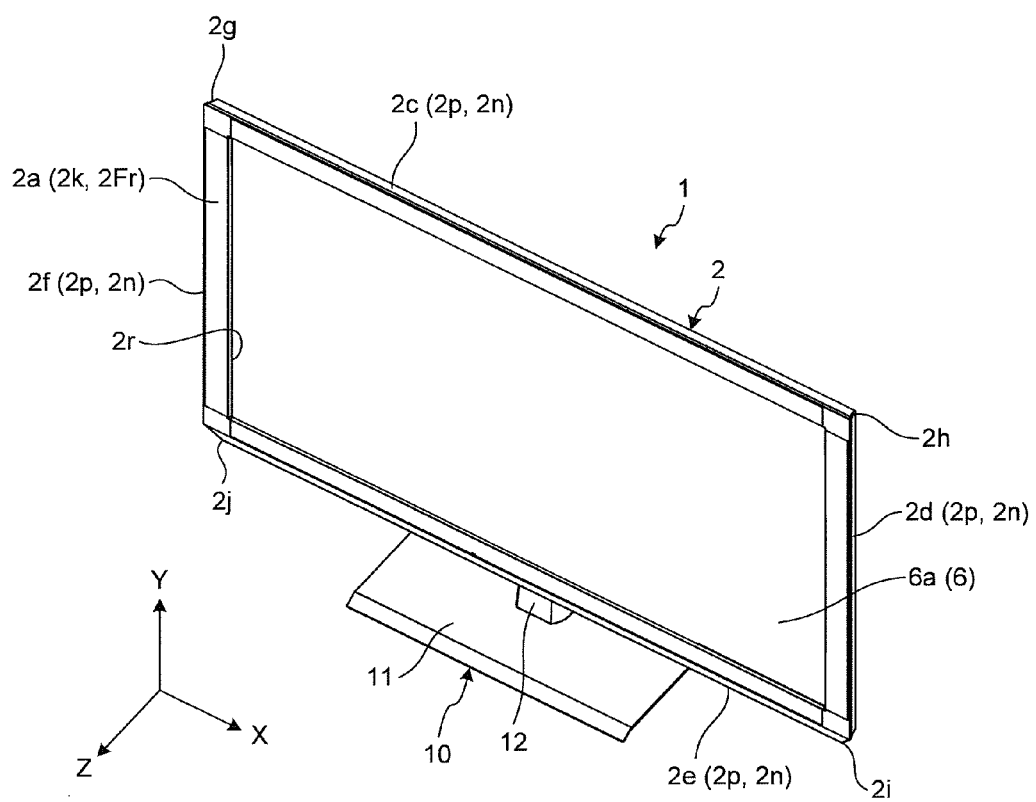
FIG. 1 is an exemplary front view of a television (TV) receiver according to a first embodiment.

In general, according to one embodiment, a television receiver comprises a housing, a support portion, a first movable portion, and a second movable portion. The housing is configured to house at least part of a display device. The support portion is configured to support the housing. The first movable portion comprises a sliding portion and a connection portion. The sliding portion is supported by one of the housing and the support portion to be rotatable in at least two directions. The connection portion is connected to another of the housing and the support portion. The second movable portion is configured to rotate in a first rotation direction together with the first movable portion, and comprises a second sliding portion, a first engagement portion, and a second engagement portion. The second sliding portion is supported by the one of the housing and the support portion to be rotatable in the first rotation direction. The first engagement portion is configured to engage with the one of the housing and the support portion to limit a rotation range in the first rotation direction. The second engagement portion is configured to engage with the first movable portion and a second rotation direction of the first movable portion to limit a rotation range in the second rotation direction.

Exemplary embodiments will be described in detail below with reference to the accompanying drawings, in which, for the sake of convenience, directions (X, Y, and Z directions) are defined as follows: X direction indicates the long-side direction (the horizontal direction) of a display screen 6a in the front view in the state where a display device 6 is located in the center of a movable range; Y direction indicates the short-side direction (the vertical direction) of the display screen 6a in the front view; and Z direction indicates the front-back direction of the display screen 6a in the front view (the depth direction, the thickness direction of a housing 2). The X, Y, and Z directions are perpendicular to one another. For the sake of convenience, the normal direction of the display screen 6a will be referred to as "front", and the opposite direction will be referred to as "back". In the embodiments and modifications thereof, like elements are designated by like reference numerals, and their description will not be repeated.

Figure 2:
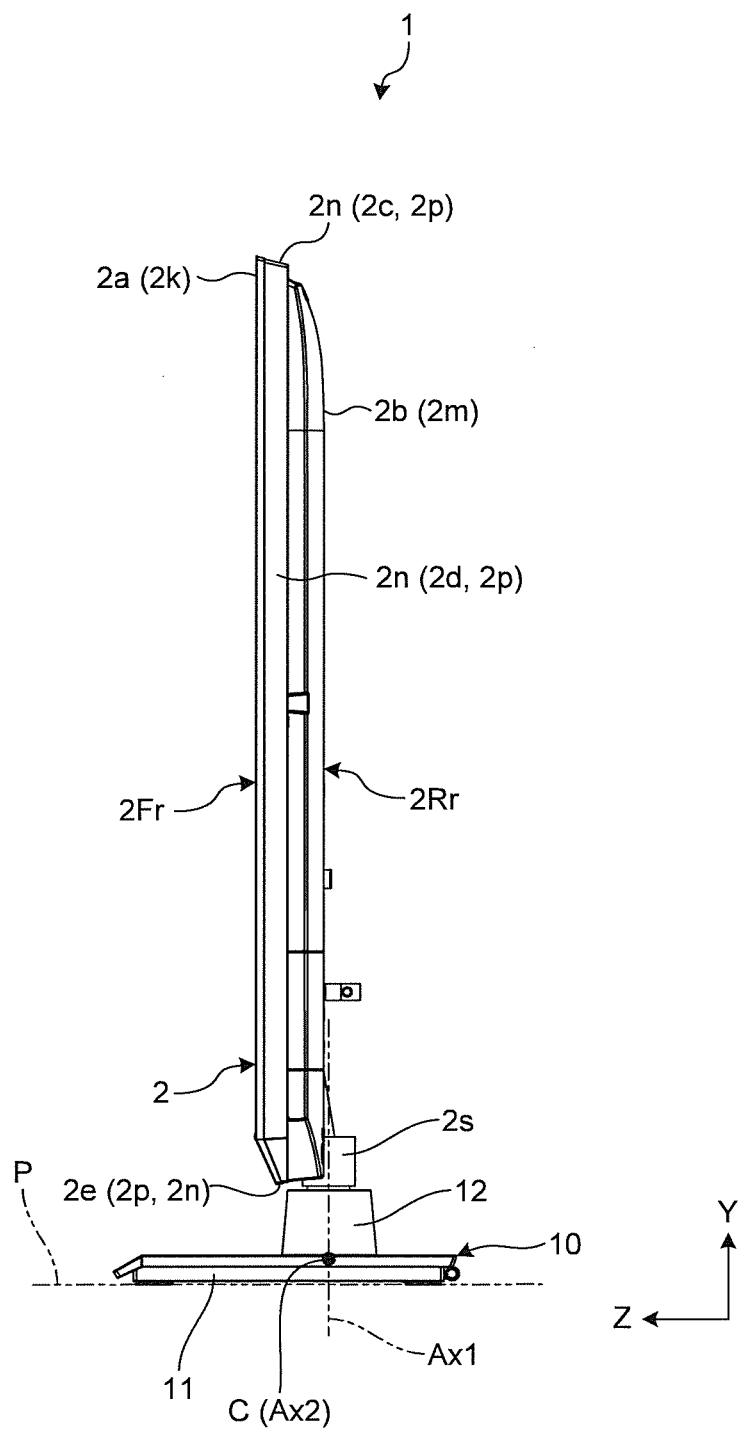
FIG. 2 is an exemplary side view of the TV receiver in the first embodiment.
Figure 3:
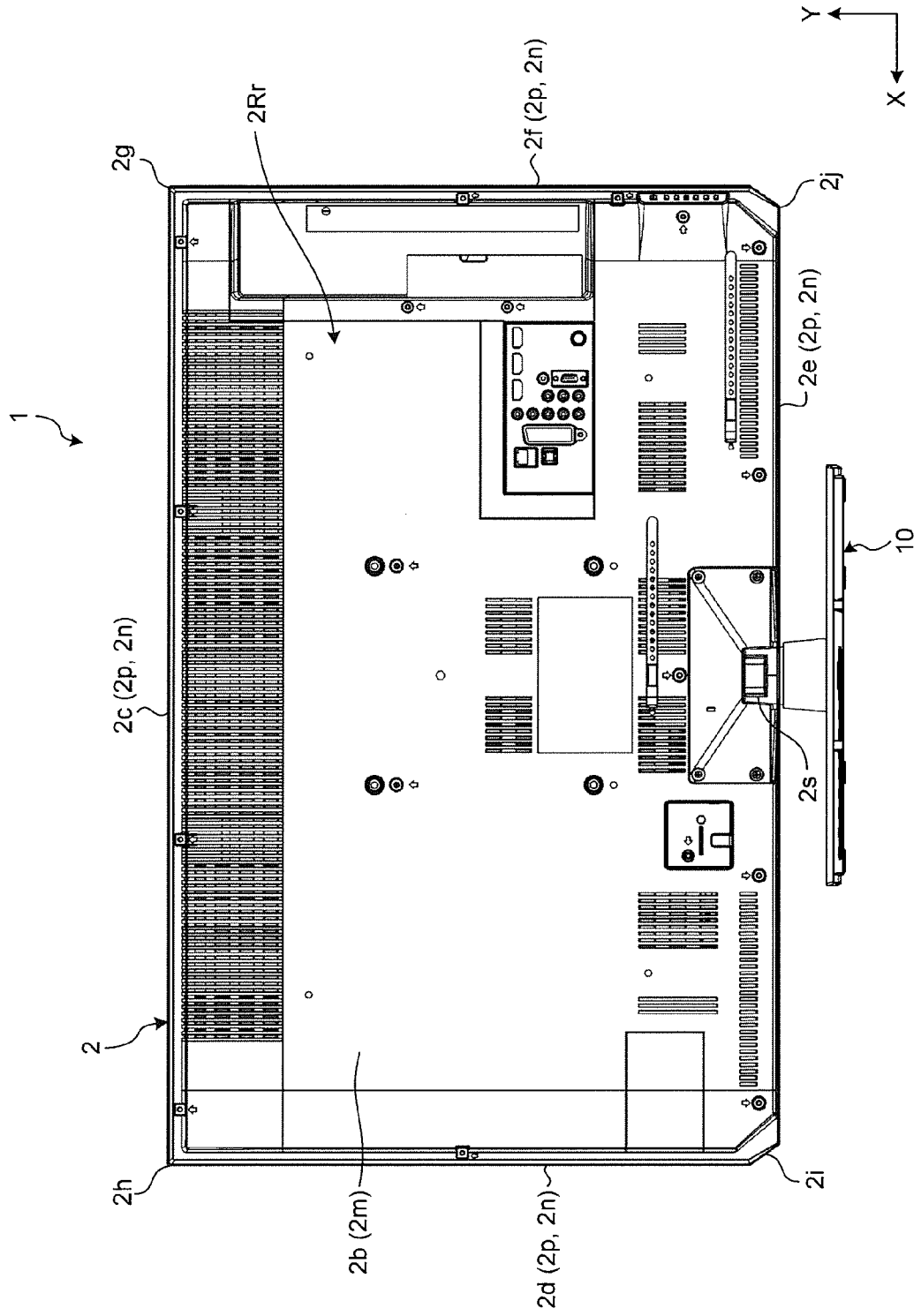
FIG. 3 is an exemplary back view of the TV receiver in the first embodiment.

As illustrated in FIGS. 1 to 3, a TV receiver 1 as an example of an electronic device of a first embodiment comprises a support portion 10 (base, stand) and the housing 2. The support portion 10 is placed on, for example, a desk, a table, or the like (placement surface P, see FIG. 2), and supports the housing 2. The support portion 10 rotatably (movably, slidably) supports the housing 2. In the first embodiment, for example, the support portion 10 supports the housing 2 in such a manner that the housing 2 is rotatable about a vertical rotation axis Ax1 (see FIG. 2) along the horizontal direction and also rotatable about a horizontal rotation axis Ax2 (see FIG. 2) in the front view along the vertical direction. That is, in the TV receiver 1 of the first embodiment, the display device 6 can be, for example, swiveled (rotation about the rotation axis Ax1) and tilted (rotation about the rotation axis Ax2).

As illustrated in FIGS. 1 to 3, in the first embodiment, for example, the housing 2 has a quadrangular shape (in the first embodiment, for example, rectangular shape) in the front view (and the back view). The housing 2 is thin in the front-back direction and in a flat rectangular parallelepiped shape. The housing 2 comprises a front surface 2a (surface, first surface) and a back surface 2b (surface, second surface) opposite the front surface 2a. The front surface 2a and the back surface 2b are substantially parallel to each other. In the front view (and the back view), the housing 2 comprises four edges 2c to 2f (sides, peripheries) and four corners 2g to 2j (points, curves, ends). The edges 2c and 2e are examples of long sides, while the edges 2d and 2f are examples of short sides. As can be seen from FIGS. 1 and 2, the display device 6 stands up.

The housing 2 further comprises, for example, a wall 2k (first wall, first portion, plate, frame, front wall, top wall) having the front surface 2a and a wall 2m (second wall, second portion, plate, back wall, rear wall, bottom wall) having the back surface 2b. The wall 2k has a quadrangular frame shape (in the first embodiment, for example, rectangular frame shape), and the wall 2m has a quadrangular shape (in the first embodiment, for example, rectangular shape). The housing 2 comprises four walls 2n (third walls, third portions, plates, side walls, edge walls) having a side surface 2p (surface, peripheral surface, third surface) between the walls 2k and 2m. The wall 2k is provided with, for example, a rectangular opening 2r. The housing 2 may be made of a synthetic resin material or a metal material.

As illustrated in FIG. 2, the housing 2 may be formed of a combination of a plurality of components (parts, members). For example, the housing 2 comprises a first member 2Fr (first portion, front member, cover, bezel, frame) including at least the wall 2k and a second member 2Rr (second portion, rear member, base, bottom, case) including at least the wall 2m. The walls 2n may be included in at least one of the first member 2Fr and the second member 2Rr (in the first embodiment, for example, both the first member 2Fr and the second member 2Rr).

The housing 2 houses therein at least part of the display device 6 (display module, display, panel). The display device 6 comprises the display screen 6a on the front surface 2a side. The display screen 6a is exposed from the opening 2r to the front side (outside) of the housing 2. The user can view the display screen 6a through the opening 2r from the front side. The display device 6 has a quadrangular shape (in the first embodiment, for example, rectangular shape) in the front view. The display device 6 is thin in the front-back direction and in a flat rectangular parallelepiped shape. The display device 6 comprises, for example, a liquid crystal display (LCD), an organic electroluminescence display (OELD), or the like. The display device 6 may be provided on the front side with a thin plate-like or sheet-like transparent touch panel (input panel, input sheet, input device, not illustrated) that covers the display screen 6a.

In the first embodiment, for example, the housing 2 houses a circuit board (control board, main board, printed circuit board, not illustrated) on the back side of the display device 6 (rear side, the wall 2m side, opposite side to the display screen 6a). The circuit board is arranged in parallel to a surface (back surface, not illustrated) of the display device 6. Besides, the circuit board is arranged spaced apart from the walls 2k, 2m, 2n, and the like. That is, there is a space between the circuit board and the walls 2k, 2m, and 2n. The circuit board is fixed to the display device 6 or the housing 2 by a fastener such as, for example, a screw (not illustrated).

In addition to a connector, a plurality of components (electronic components, devices, not illustrated) such as a central processing unit (CPU) are mounted on the circuit board. The electronic components include a heat generating component. A cooling mechanism (heat receiver, heat transmitter, radiator, fan, etc., not illustrated) may be provided for an electronic component (heat generating component) that generates a large amount of heat. The circuit board and the electronic components form at least part of a control circuit (not illustrated). The control circuit may comprise, for example, a video signal processing circuit, a tuner, a high-definition multimedia interface (HDMI) signal processor, an audio-video (AV) input terminal, a remote controller signal receiver, a controller, a selector, an on-screen display interface, a storage module (e.g., a read only memory (ROM), a random access memory (RAM), a hard disk drive (HDD), etc.), an audio signal processing circuit, and the like. The control circuit controls the output of video (moving images, still images, etc.) on the display screen 6a of the display device 6, the output of sound from a speaker (not illustrated), the light emission of a light-emitting diode (LED) (not illustrated), and the like. The display device 6, the speaker, the LED, and the like are part of an output module.

The support portion 10 is placed on the placement surface P (see FIG. 2) of a table, a desk, or the like, and rotatably (movably, slidably) supports the housing 2. As illustrated in FIGS. 1 to 3, in the first embodiment, for example, the support portion 10 comprises a base 11 and a leg 12. The base 11 has a quadrangular shape (in the first embodiment, for example, rectangular shape) viewed from the top (from the Y direction). The base 11 is thin in the vertical direction and has a flat plate-like (i.e., rectangular plate-like) appearance extending along the placement surface P (see FIG. 2), i.e., along the X and Z directions, the XZ plane. The leg 12 is columnar and protrudes upward (in the Y direction) from the base 11.

Figure 4:
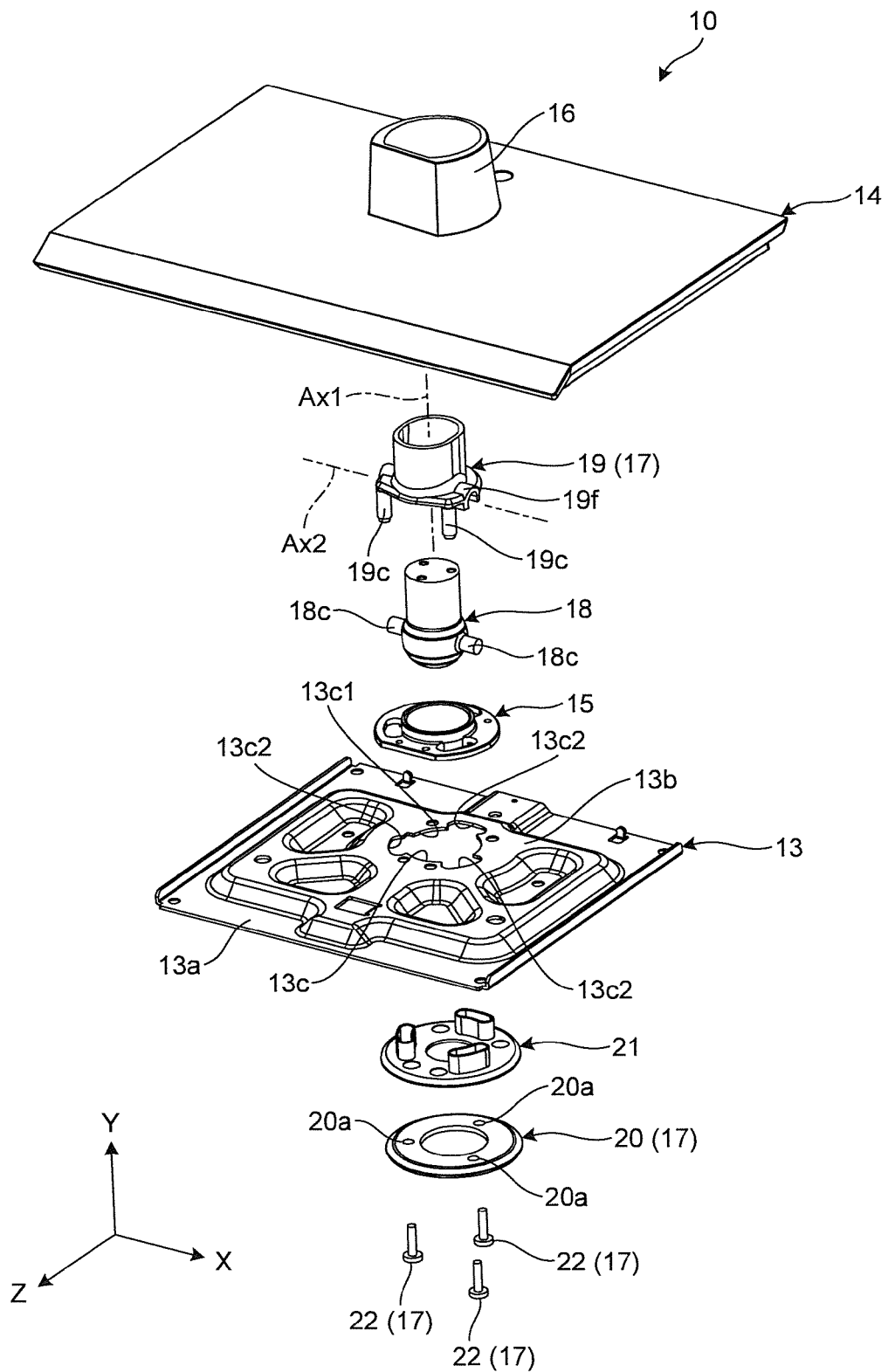
FIG. 4 is an exemplary exploded perspective view of a support portion of the TV receiver in the first embodiment.

In the first embodiment, for example, the base 11 includes a first member 13, part of a second member 14, a third member 15, and a fourth member 21 as illustrated in FIG. 4. The first member 13 mainly functions as a member to support the structure of the housing 2 and the like, and is made of a metal material or the like. The rigidity and strength of the base 11 is mainly ensured by the first member 13. The second member 14 mainly functions as a cover of the first member 13, and is made of a synthetic resin material or the like. The third member 15 mainly functions as a receiving portion of a movable portion 17, and is made of a metal material or the like. The second member 14 may ensure or improve the rigidity.

In the first embodiment, for example, the leg 12 comprises a fixing portion 16 (part of the second member 14), part of the movable portion 17, and part of a movable portion 18 as illustrated in FIG. 4. The fixing portion 16 is part of the second member 14, and mainly functions as a cover (outer wall) to cover the movable portions 17 and 18. The movable portions 17 and 18 are rotatably supported by the first member 13 that is an example of the fixing portion of the support portion 10. One of the movable portions 17 and 18 (in the first embodiment, for example, the movable portion 18) may be rotatably supported by the other (in the first embodiment, for example, the movable portion 17). In the first embodiment, for example, the movable portion 17 is supported by the base 11 (the third member 15 thereof) to be rotatable about the rotation axis Ax1 extending along the Y direction (rotatable in the horizontal direction). Meanwhile, the movable portion 18 rotates about the rotation axis Ax1 together with the movable portion 17. The movable portion 18 is supported by the base 11 (the third member 15 thereof) and the movable portion 17 to be rotatable about the rotation axis Ax2 (rotatable in the vertical direction). The rotation axis Ax2 extends along the placement surface P (horizontal direction, XZ plane, see FIG. 2). The rotation direction about the rotation axis Ax1 is an example of a first rotation direction, while the rotation direction about the rotation axis Ax2 is an example of a second rotation direction. In the first embodiment, for example, the support structure of the movable portion 17 achieves the swivel function of the housing 2 having the display device 6, and the support structure of the movable portion 18 achieves the tilt function of the housing 2 having the display device 6. The movable portion 17 may be made of a synthetic resin material or a metal material (in the first embodiment, for example, metal material). The movable portion 18 may be made of a synthetic resin material or a metal material (in the first embodiment, for example, synthetic resin material). In the first embodiment, for example, the movable portion 17 comprises a first component 19 and a second component 20. Further, in the first embodiment, for example, there is provided the fourth member 21 between the second component 20 and the first member 13 to facilitate the slide of them. The movable portion 17 is an example of a second movable portion, and the movable portion 18 is an example of a first movable portion. The movable portion 18 is also an example of a sliding portion. While the fourth member 21 is fixed to the first member 13 as an example of the fixing portion of the support portion 10, it rotates (slides) relative to the second component 20 of the movable portion 17. The fourth member 21 is an example of a sliding portion.

Figure 5:
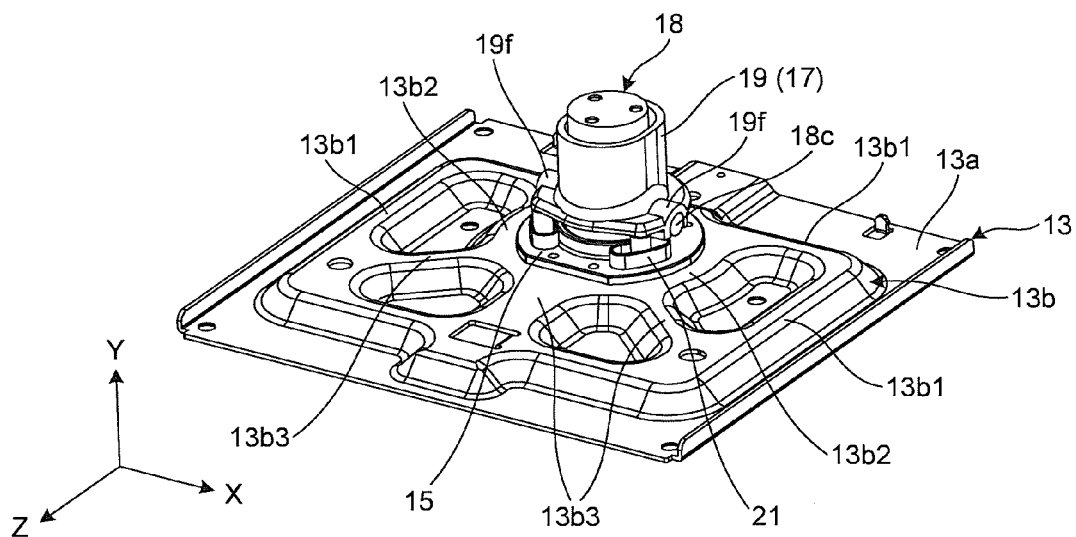
FIG. 5 is an exemplary perspective view of part of the support portion of the TV receiver in the first embodiment.
Figure 6:
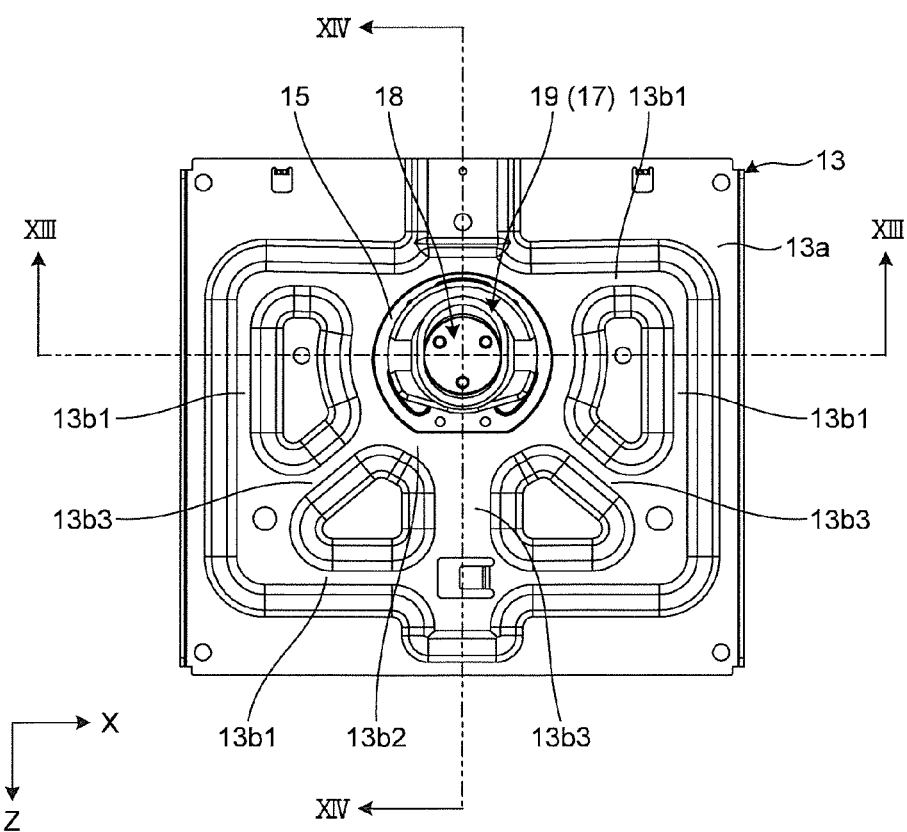
FIG. 6 is an exemplary plan view of part of the support portion of the TV receiver in the first embodiment.

In the following, a description will be given in detail of the structure and function of each element except the second member 14 and the fixing portion 16 functioning as a cover of the support portion 10. In the first embodiment, for example, the first member 13 of the base 11 comprises a wall 13a and a raised (or recessed) portion 13b as illustrated in FIGS. 4 to 6. The wall 13a is located on one side of the vertical direction (in the first embodiment, for example, bottom side) and extends along the horizontal direction (along the XZ plane). The raised portion 13b is raised upward or downward (in the first embodiment, for example, upward) from the wall 13a in a ridge-like form. The raised portion 13b comprises a rectangular ring-like periphery 13b1, a circular ring-like inner circumference 13b2, and a plurality of extending portions 13b3 extending radially from the inner circumference 13b2. The raised portion 13b is formed in a frame-like shape. That is, the raised portion 13b can be referred to as a frame (framework). The wall 13a and the raised portion 13b of the first member 13 may be formed by, for example, raising (or recessing) a rectangular plate-like material from one side to the other. The first member 13 has a convexo-concave shape including the wall 13a and the raised portion 13b, and the convexo-concave shape increases the rigidity. The first member 13 further comprises an opening 13c. In the first embodiment, for example, the opening 13c is located inside the inner circumference 13b2. More specifically, as illustrated in FIG. 4, the opening 13c comprises a circular first opening 13c1 and a plurality of (in the first embodiment, for example, three) second openings 13c2 extending from the periphery of the first opening 13c1 to the outside in the radial direction. The elongated arc-like second openings 13c2 are arranged along the periphery of the first opening 13c1 at angular intervals (in the first embodiment, for example, at intervals of 120°). The first member 13 is provided with a bulged portion that is bulged upward at where the opening 13c is formed together with the inner circumference 13b2 of the raised portion 13b. The bulged portion is provided therein with a space to house the second component 20 of the movable portion 17, the fourth member 21, the head of a screw 22, and the like. The raised portion 13b may be formed by joining a plurality of members to have a structure with closed cross-section.

Figure 7:
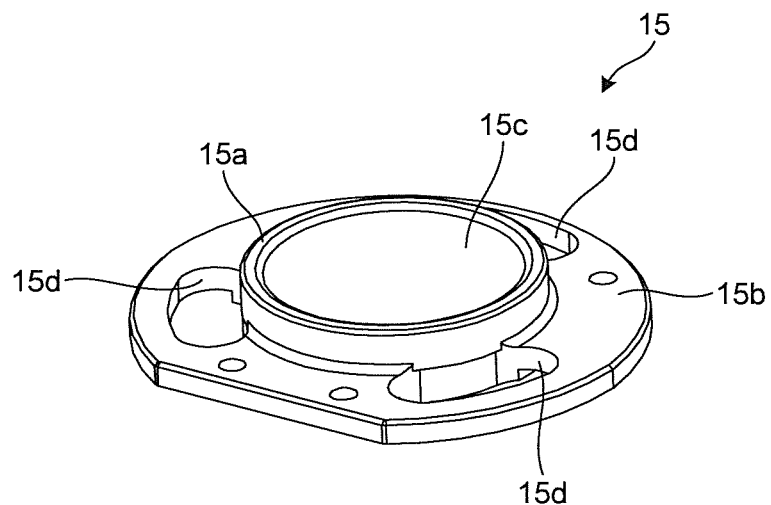
FIG. 7 is an exemplary perspective view of a third member of the TV receiver in the first embodiment.

In the first embodiment, for example, the third member 15 illustrated in FIGS. 4 to 6 is fixed to the first member 13. In other words, the first member 13 and the third member 15 are integrated with each other. In the first embodiment, for example, as illustrated in FIG. 7, the third member 15 comprises a receiving portion 15a and a connection portion 15b. The receiving portion 15a is provided with a spherical portion 15c (spherical surface) as a partly circular (in the first embodiment, for example, semispherical) recess having an opening on the upper side (the movable portion 18 side). The spherical portion 15c is located in the first opening 13c1 of the first member 13 (see FIG. 4). The spherical portion 15c is inserted into the first opening 13c1 from above. The spherical portion 15c rotatably supports a spherical portion 18a (spherical surface) of the movable portion 18 from the outside and the lower side. The spherical portion 15c (the receiving portion 15a) is an example of a support portion that rotatably supports the spherical portion 18a. The connection portion 15b may be called flange extending around the receiving portion 15a. The connection portion 15b is arranged on the periphery of the first opening 13c1 of the first member 13. The connection portion 15b is connected to the periphery of the first opening 13c1 of the first member 13 by fasteners such as, for example, screws (not illustrated). The connection portion 15b is provided with openings 15d that correspond to the second openings 13c2 of the first member 13 as the fixing portion of the support portion 10, respectively. Each of the openings 15d and corresponding one of the second openings 13c2 overlap in the vertical direction (the thickness direction of the first member 13, Y direction). The third member 15 may be made of, for example, a synthetic resin material or a metal material.

Figure 8:
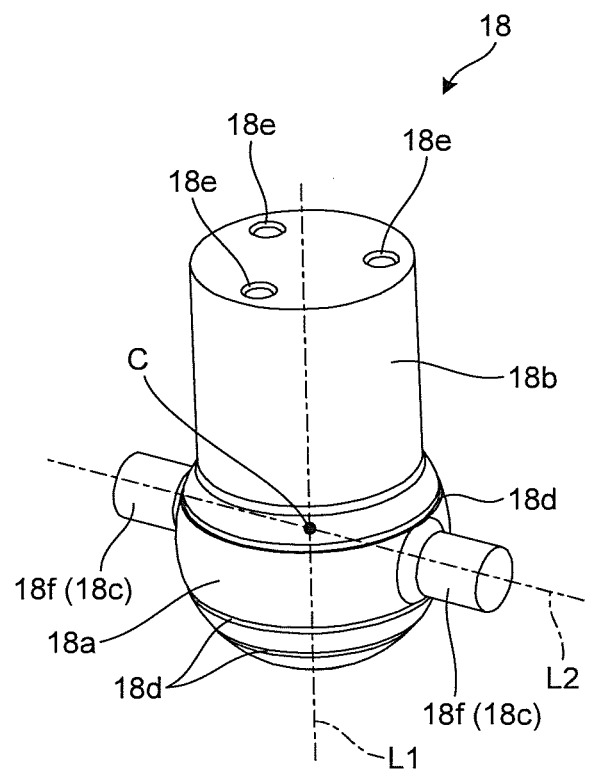
FIG. 8 is an exemplary perspective view of a first movable portion of the TV receiver in the first embodiment.
Figure 9:
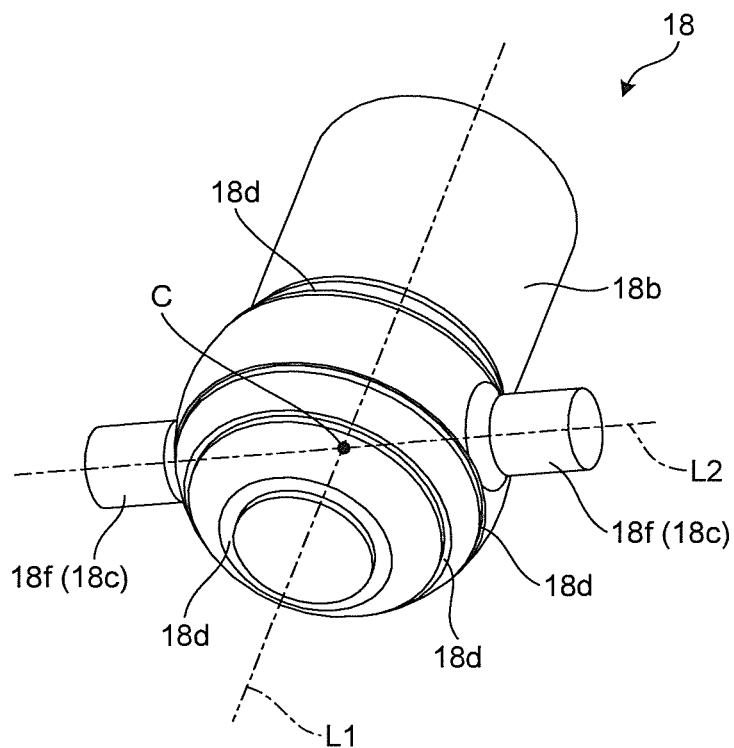
FIG. 9 is an exemplary perspective view of the first movable portion of the TV receiver viewed from a different angle in the first embodiment.

In the first embodiment, for example, as illustrated in FIG. 4, the movable portion 18 is located above the third member 15 as the fixing portion of the support portion 10. As illustrated in FIGS. 8 and 9, the movable portion 18 comprises the spherical portion 18a, a first protrusion 18b, and second protrusions 18c. The spherical portion 18a has a spherical outer circumferential surface. The spherical portion 18a (spherical surface) as an bulge is fitted in the spherical portion 15c as a recess of the third member 15. The spherical portion 18a is along the spherical surface and in contact with the spherical portion 15c. The spherical portions 15c and 18a are an example of a contact portion and a sliding portion (bearing). The surface of the spherical portions 15c and 18a (i.e., an example of a contact portion) need not necessarily be a continuous spherical surface, and may be, for example, partly provided with a groove 18d, a recess, a dimple, a protrusion, or the like. The spherical portions 15c and 18a (i.e., an example of a sliding portion, a contact portion along or on the spherical surface) that are relatively rotatable may be formed of a plurality of divided (split) parts. A lubricant such as grease may be applied between the spherical portions 15c and 18a, i.e., a portion where the spherical portion 15c as the fixing portion of the support portion 10 and the spherical portion 18a of the movable portion 18 slide. In this case, the groove 18d functions as a container of the lubricant. The movable portion 18 may be made of, for example, a synthetic resin material with relatively high abrasion resistance (e.g., polyacetal, etc.).

In the first embodiment, for example, as illustrated in FIGS. 8 and 9, the first protrusion 18b and the second protrusions 18c extend along lines L1 and L2 passing though the center C of the spherical portion 18a, respectively, toward the outside of the spherical portion 18a. That is, the first protrusion 18b and the second protrusions 18c protrude toward the outside in the radial direction of the spherical portion 18a. The lines L1 and L2 cross each other (in the first embodiment, for example, they are perpendicular to each other). In the assembled state where the housing 2 and the display device 6 are located in the center of the movable range with respect to the support portion 10, the line L1 extends substantially along the vertical direction (Y direction), while the line L2 extends substantially along the horizontal direction (X direction) in the front view of the display screen 6a. The first protrusion 18b is relatively thick (thicker than the second protrusions 18c) and long. The first protrusion 18b is column-shaped. In the first embodiment, for example, the first protrusion 18b is provided with a connection portion 18e at the end. The connection portion 18e is connected to the housing 2 (in the first embodiment, for example, a connection portion 2s of the housing 2) with a fastener such as a screw (not illustrated). The connection portion 18e may be formed as, for example, a female screw portion (female screw hole). The second protrusions 18c are relatively thin (thinner than the first protrusion 18b) and short. In the first embodiment, the two second protrusions 18c along the diameter of the spherical portion 18a protrude from the spherical portion 18a toward opposite sides in a direction crossing (perpendicular to) the direction in which the first protrusion 18b protrudes. The second protrusions 18c are column-shaped. With the structure described above, the movable portion 18 is rotatable along the surface of the spherical portion 15c with respect to the third member 15. However, the rotation range of the movable portion 18 is directly or indirectly limited by the first protrusion 18b and the second protrusions 18c. As described above, according to the first embodiment, the movable portion 18 that is rotatably supported by the fixing portion of the support portion 10 and functions as a sliding portion is provided with the connection portion 18e to the housing 2 and an engagement portion with the support portion 10. Thus, for example, the structure of the support portion 10 can be simplified compared to the case where they are formed as separate components.

Figure 10:
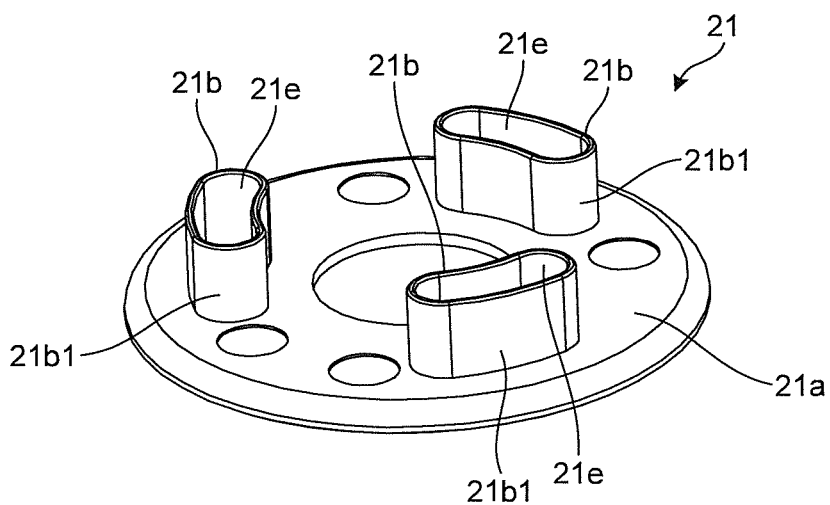
FIG. 10 is an exemplary perspective view of a fourth member of the TV receiver in the first embodiment.
Figure 11:
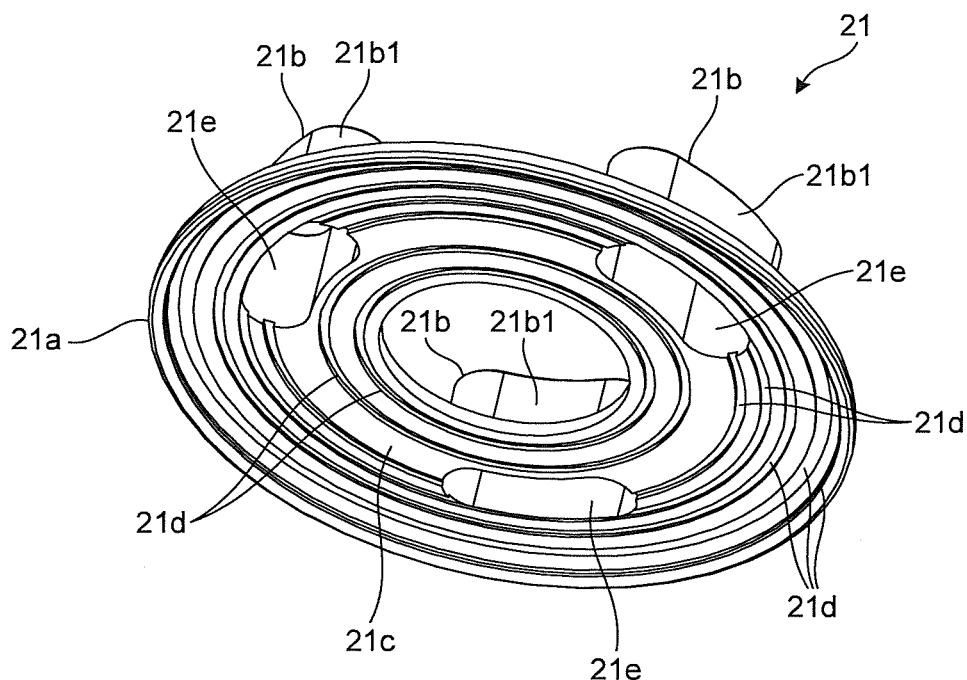
FIG. 11 is an exemplary perspective view of the fourth member of the TV receiver viewed from a different angle in the first embodiment.

In the first embodiment, for example, as illustrated in FIGS. 10 and 11, the fourth member 21 comprises a wall 21a and protrusions 21b. The wall 21a is formed in a disc-like (circular plate-like) shape. The wall 21a is located below the first member 13 as the fixing portion of the support portion 10 (on the opposite side of the movable portion 18). The wall 21a has a surface 21c that faces the second component 20 and is provided with a ring-like groove 21d. A lubricant such as grease may be applied between the wall 21a and the second component 20, i.e., a portion where the wall 21a as the fixing portion of the support portion 10 and the second component 20 of the movable portion 17 slide. In this case, the groove 21d functions as a container of the lubricant. The fourth member 21 may be made of a synthetic resin material with relatively high abrasion resistance (e.g., polyacetal, etc.). The protrusions 21b pass through the second openings 13c2 of the first member 13 as the fixing portion of the support portion 10 and the openings 15d of the third member 15 overlapping them, respectively. The protrusions 21b each comprise an outer circumference 21b1 extending along the inner circumference of the openings 15d and the second openings 13c2. Thus, the protrusions 21b engage with the periphery of the second openings 13c2 and the openings 15d each other, which provides the function of positioning of the fourth member 21 with respect to the fixing portion of the support portion 10, position adjustment, rotation stopper, and slide stopper. The protrusions 21b are an example of a peripheral portion. The protrusions 21b are each formed in a wall-like (cylindrical) shape surrounding an opening 21e. That is, the protrusions 21b are an example of a wall, a peripheral wall, a cylindrical portion, and a tubular portion. In the first embodiment, for example, a second protrusion 19c that connects the first component 19 and the second component 20 of the movable portion 17 passes the opening 21e of the protrusions 21b. Incidentally, each of the protrusions 21b need not necessarily be provided over the entire periphery of the opening 21e, and it may be provided along part of the periphery of the opening 21e. The wall 21a is an example of a second sliding portion. The second protrusion 19c is an example of a connection portion.

In the first embodiment, for example, as illustrated in FIG. 4, the movable portion 17 comprises the first component 19, the second component 20, and the screw 22. More specifically, the first component 19 and the second component 20 are coupled with each other via the screw 22 to be integrated. That is, in the first embodiment, the first component 19 of the movable portion 17 is located above (on one side of) the first member 13 as the fixing portion of the support portion 10, while the second component 20 of the movable portion 17 is located below (on the other side of) the first member 13 as the fixing portion of the support portion 10. The first member 13 as the fixing portion of the support portion 10 is sandwiched from both sides between the first component 19 and the second component 20. With this structure, the first member 13 as the fixing portion of the support portion 10 can firmly support the movable portion 17. Moreover, the structure of the first member 13 as the fixing portion of the support portion 10 can be simplified. The tightening torque of the screw 22 as a fastener changes a force (normal force) acting on sliding portions, contact portions, receiving portions, and bearings. Accordingly, with the tightening torque of the screw 22, the rotation torque of the movable portions 17 and 18 as well as the retention of the support portion 10 to support the housing 2 can be set variable.

Figure 12:
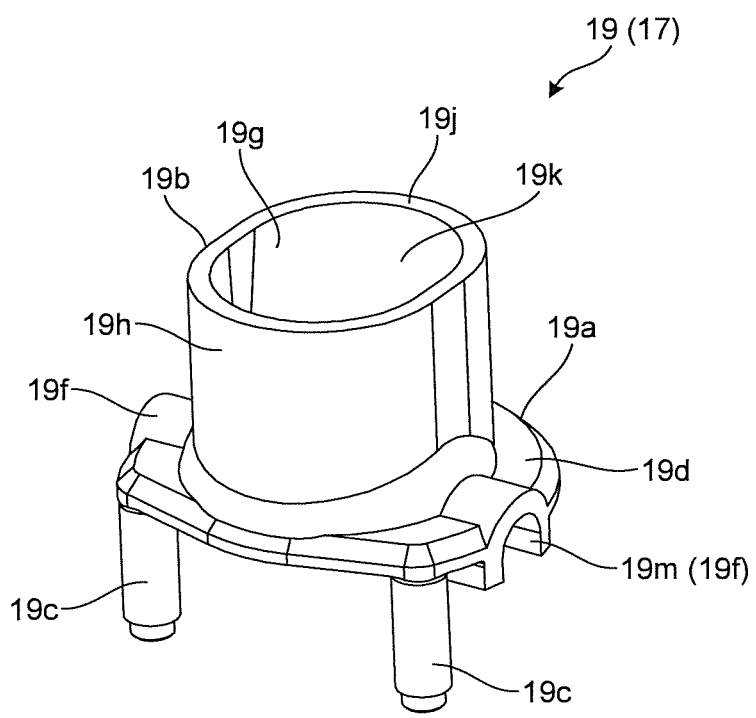
FIG. 12 is an exemplary perspective view of a second movable portion of the TV receiver in the first embodiment.

In the first embodiment, for example, as illustrated in FIG. 12, the first component 19 comprises a base 19a, a first protrusion 19b, and the second protrusion 19c. The base 19a comprises a wall 19d, a spherical portion 19e (see FIGS. 13, 14, etc.), and an engagement portion 19f. The wall 19d is formed in a disc-like (circular ring-like, plate-like) shape. The spherical portion 19e (spherical surface) is provided as a partly spherical recess having an opening downward. The wall 19d may be referred to as a flange extending to the outside of the spherical portion 19e. The spherical portion 19e has a spherical inner circumferential surface. The spherical portion 18a as a convex of the movable portion 18 is inserted in the spherical portion 19e as a concave of the first component 19 of the movable portion 17. The spherical portion 19e is an example of a support portion that movably supports the spherical portion 18a. Besides, the spherical portion 19e is configured to be in contact with the spherical portion 18a.

Namely, the spherical portions 18a and 19e are an example of a contact portion and a sliding portion (bearing). The spherical portion 18a of the movable portion 18 is sandwiched between the spherical portion 19e of the first component 19 of the movable portion 17 and the spherical portions 15c (the receiving portion 15a) of the third member 15 as the fixing portion of the support portion 10 which are located opposite each other, and is movably supported. The surface of the spherical portions 18a and 19e (i.e., an example of a contact portion) need not necessarily be a continuous spherical surface, and may be, for example, partly provided with the groove 18d, a slit, a recess, a dimple, a protrusion, or the like. The spherical portions 18a and 19e (i.e., an example of a sliding portion, a contact portion along or on the spherical surface) that are relatively rotatable may be formed of a plurality of divided (split) parts. A lubricant such as grease may be applied between the spherical portion 18a of the movable portion 18 and the spherical portion 19e of the movable portion 17, i.e., a portion where the spherical portions 18a and 19e slide. In this case, the groove 18d functions as a container of the lubricant. The first component 19 may be made of, for example, a synthetic resin material or a metal material (in the first embodiment, for example, metal material). The spherical portion 19e is an example of a receiving portion. The groove 18d may be provided to the spherical portions 15c and 19e.

Figure 13:
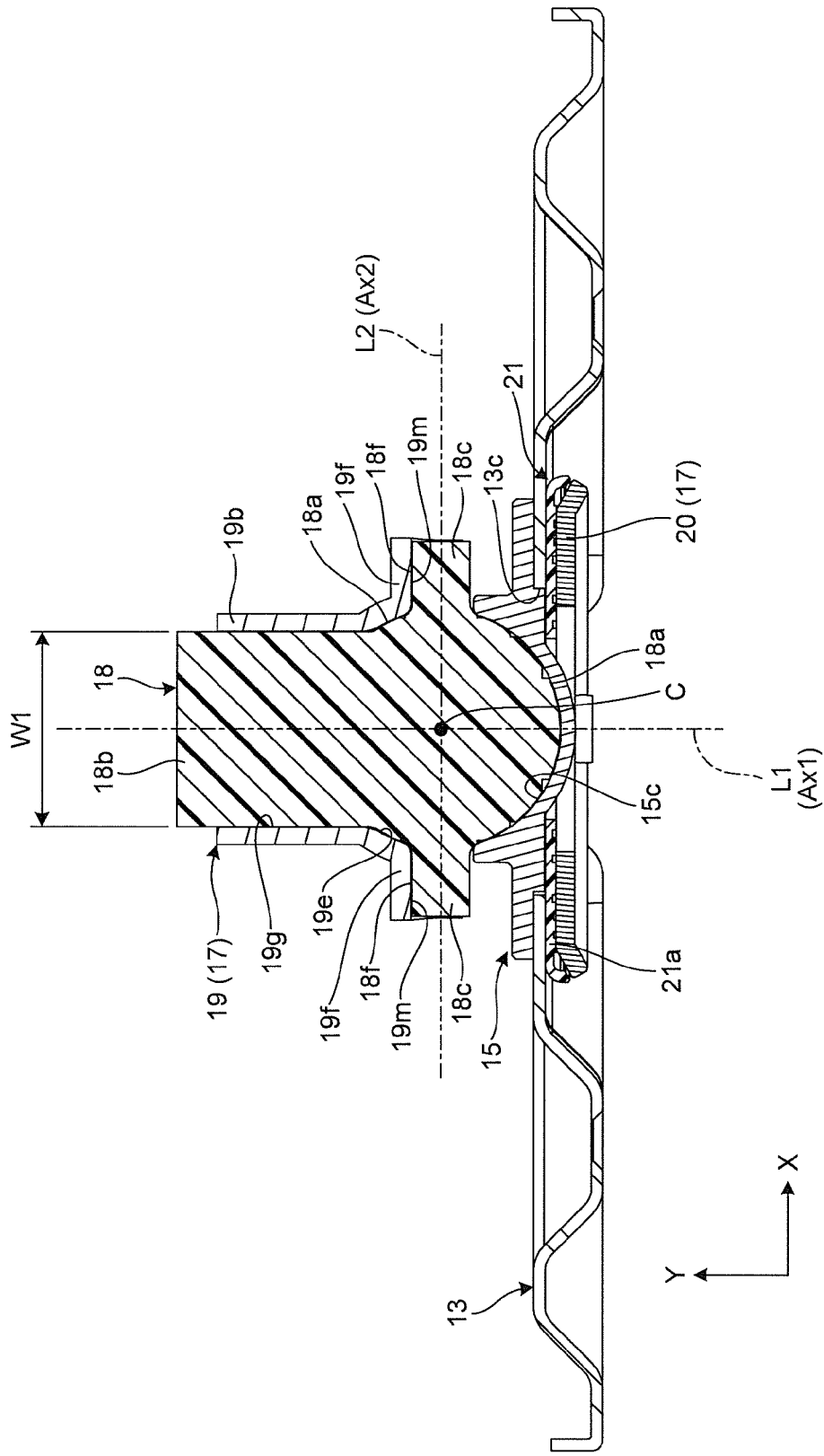
FIG. 13 is an exemplary cross-sectional view taken along a line XIII-XIII in FIG. 6 in the first embodiment.
Figure 14:
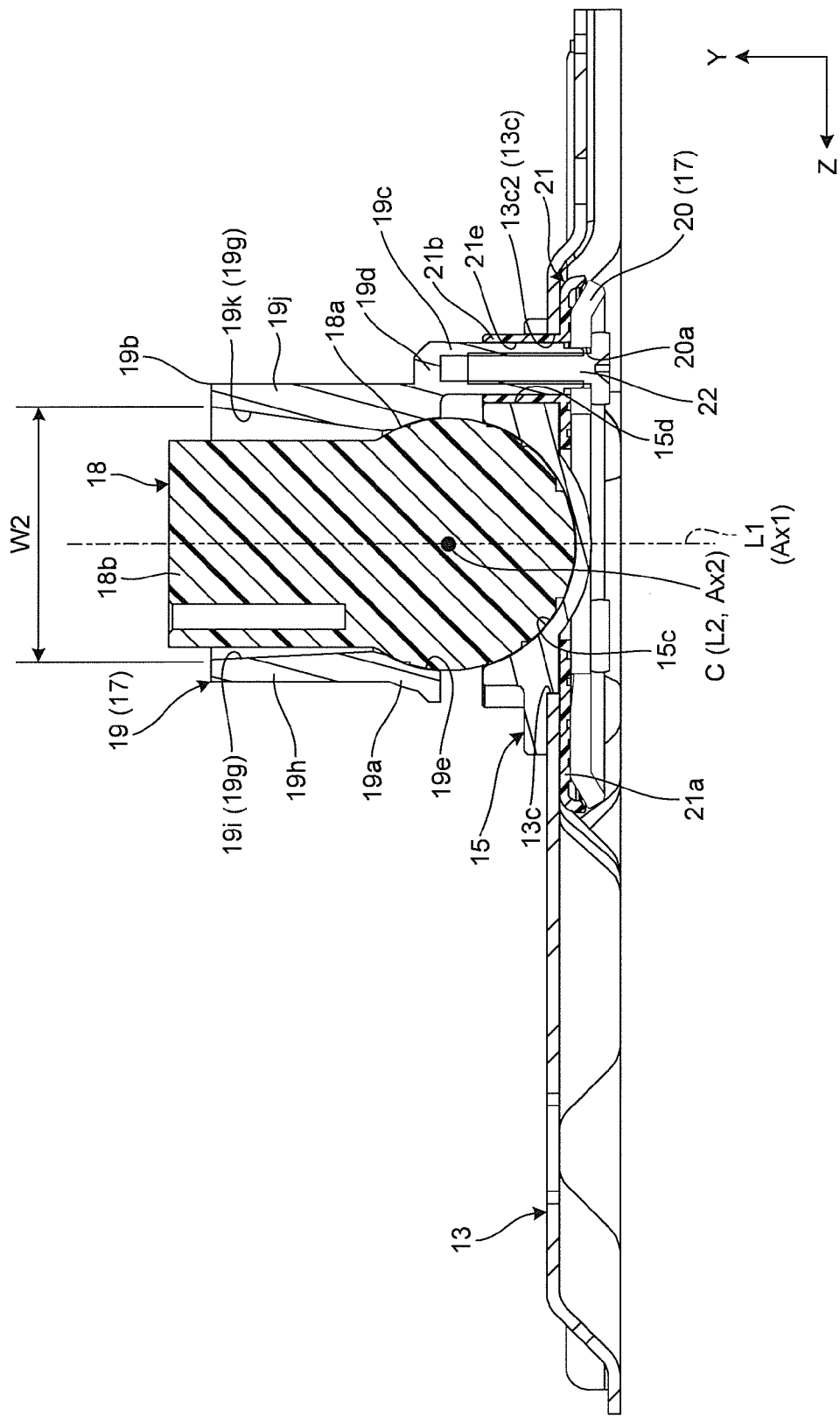
FIG. 14 is an exemplary cross-sectional view taken along a line XIV-XIV in FIG. 6 illustrating the state where the first movable portion is located in the center in the first embodiment.
Figure 15:
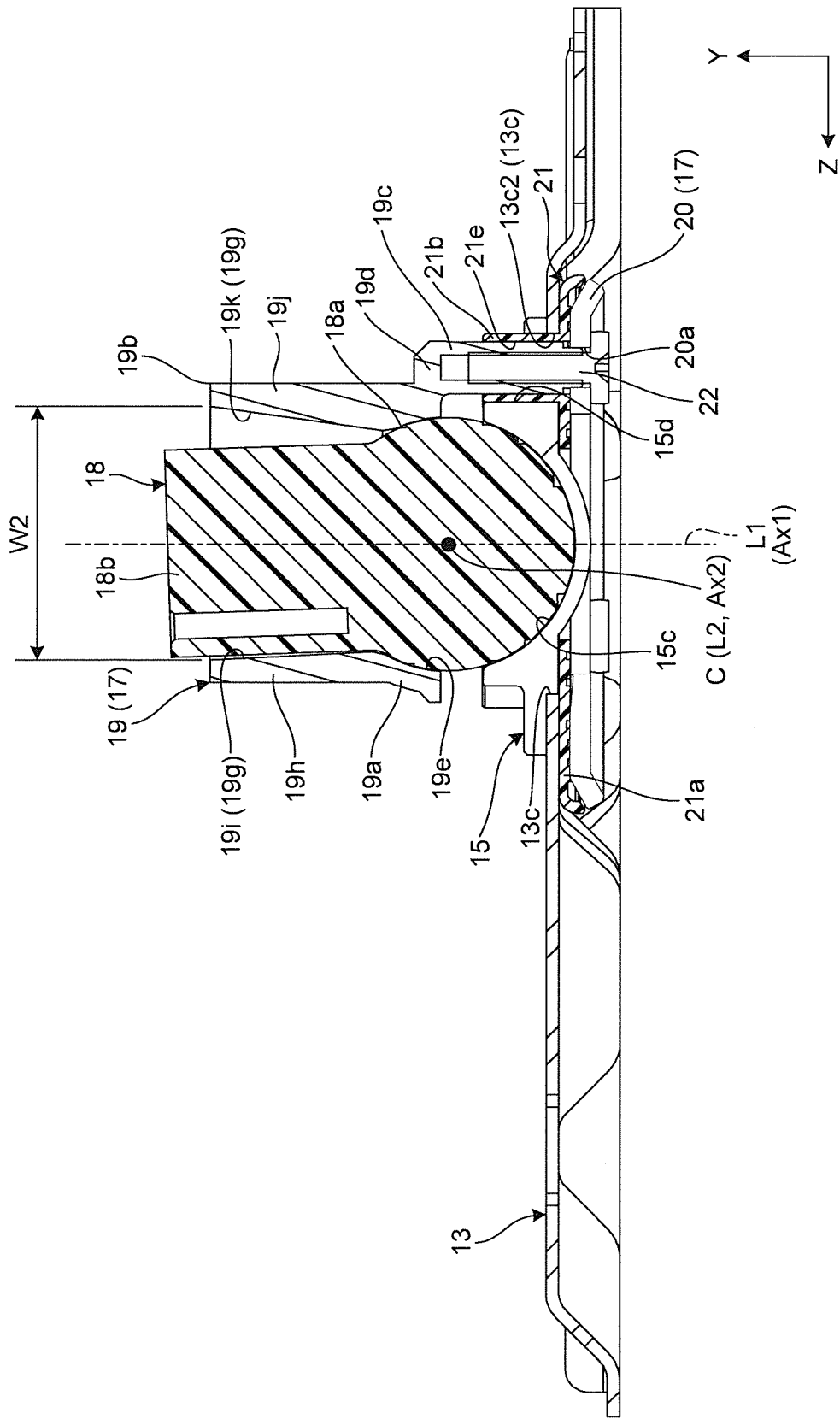
FIG. 15 is an exemplary cross-sectional view taken along the line XIV-XIV in FIG. 6 illustrating the state where the first movable portion is located in the front side in the first embodiment.
Figure 16:
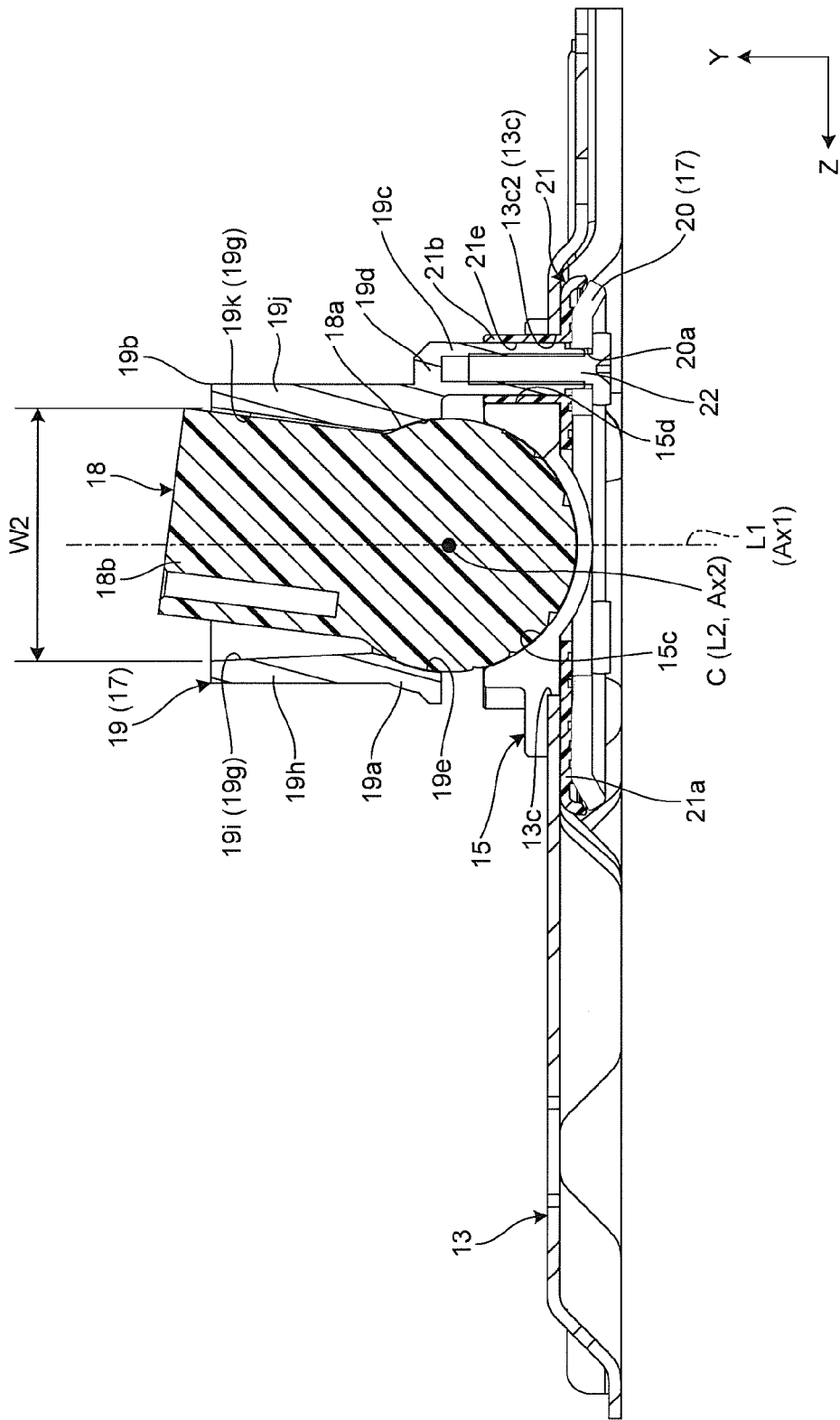
FIG. 16 is an exemplary cross-sectional view taken along the line XIV-XIV in FIG. 6 illustrating the state where the first movable portion is located in the back side in the first embodiment.

In the first embodiment, for example, as illustrated in FIG. 12, the first protrusion 19b is formed in a cylindrical (tubular) shape. In the first embodiment, for example, as illustrated in FIGS. 4 and 13 to 16, the first protrusion 18b of the movable portion 18 passes through an opening 19g inside the first protrusion 19b and is exposed from the end of the first protrusion 19b. In the first embodiment, for example, as illustrated in FIGS. 13 and 14, the width of the opening 19g varies depending on the direction. More specifically, as illustrated in FIG. 13, the width W1 of the opening 19g in the direction along the second protrusions 18c of the movable portion 18 is the same as or slightly larger than the width of the first protrusion 18b. Meanwhile, as illustrated in FIGS. 14 to 16, the width W2 of the opening 19g in the direction perpendicular to the second protrusions 18c is larger than the width of the first protrusion 18b (W2>W1). With this, as illustrated in FIGS. 14 to 16, the movable portion 18 can rotate about the line L2 (rotation axis Ax2) passing though the center C of the spherical portion 18a. The opening 19g has an circular cross-section elongated along the front-back direction (Z direction), and the length in the longitudinal direction increases from the bottom (base side) to the top (end side) of the first protrusion 19b. That is, a wall 19h of the first protrusion 19b on one side (front side) in the longitudinal direction has a concave inclined surface 19i that extends forward toward the upper side along the inclination of the first protrusion 18b leaning forward. On the other hand, a wall 19j of the first protrusion 19b on the other side (back side) in the longitudinal direction has a concave inclined surface 19k that extends backward toward the upper side along the inclination of the first protrusion 18b leaning backward. With this structure, in the first embodiment, for example, the first protrusion 18b of the movable portion 18 slides (rotates, moves) in the front-back direction about the center C of the spherical portion 18a in the opening 19g as being guided by the wall (see FIG. 12) of the first protrusion 19b of the first component 19 of the movable portion 17 in the short-side direction. In the first embodiment, for example, as illustrated in FIGS. 14 and 16, the first protrusion 18b of the movable portion 18 engages with the walls 19h and 19j of the first component 19 of the movable portion 17, which limits the rotation range of the movable portion 18. That is, in the first embodiment, the walls 19h and 19j are an example of a second engagement portion, while the first protrusion 18b of the movable portion 18 is an example of an engagement portion that engages with the walls 19h and 19j as an example of the second engagement portion.

In the first embodiment, for example, as illustrated in FIGS. 4 and 13, the engagement portion 19f of the first component 19 covers the second protrusion 18c of the movable portion 18 from above and the outside. More specifically, the engagement portion 19f is formed by partly denting (projecting) the wall 19d from the lower to upper side. The engagement portion 19f has a cylindrical circumferential surface (inner circumferential surface) 19m (see FIG. 13) that covers a cylindrical circumferential surface (outer circumferential surface) 18f (see FIGS. 8 and 9) from above and the outside along the circumferential surface 18f. While the movable portion 18 is sliding (rotating, moving) as illustrated in FIGS. 14 to 16, the engagement portion 19f functions as a support portion (receiving portion, bearing) that movably supports the second protrusion 18c. The circumferential surfaces 18f and 19m extend along a cylindrical surface with the line L2 (rotation axis Ax2) passing though the center C of the spherical portion 18a as the center.

In the first embodiment, for example, as illustrated in FIGS. 4, 12, and 14, the second protrusion 19c extends downward (toward the second component 20) from the wall 19d. The second protrusion 19c passes through the opening 13c (the second opening 13c2) of the first member 13, the opening 15d of the third member 15, and the opening 21e of the fourth member 21. In other words, the second protrusion 19c passes through the first member 13 as the fixing portion of the support portion 10 in the vertical direction (Y direction, front-back direction). In the first embodiment, for example, the second component 20 of the movable portion 17 is connected to the end of the second protrusion 19c. More specifically, a fastener such as the screw 22 passing through a through hole 20a in the second component 20 is connected to a connection portion (e.g., female screw hole) corresponding to a fastener in the second protrusion 19c, and thereby the first component 19 and the second component 20 are integrated together. In the first embodiment, the first component 19 is an example of a first portion, the second component 20 is an example of a second portion, and the second protrusion 19c is an example of a connection portion.

Figure 17:
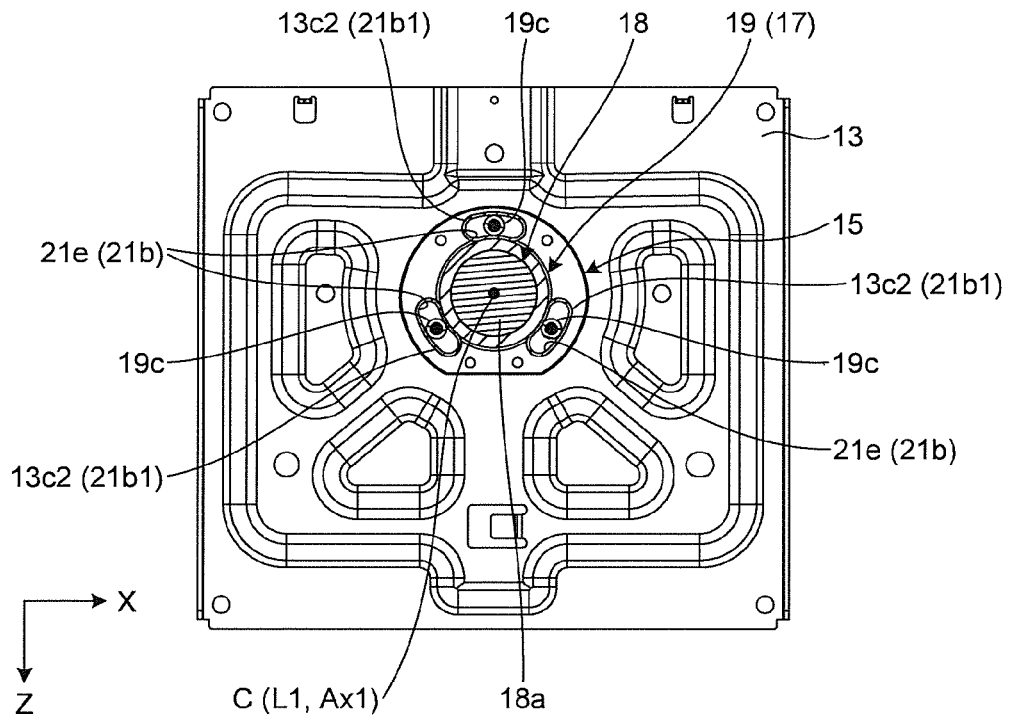
FIG. 17 is an exemplary plan view of part of the support portion of the TV receiver including the cross-section of a protrusion illustrating the state where the first movable portion and the second movable portion are located in the center in the first embodiment.
Figure 18:
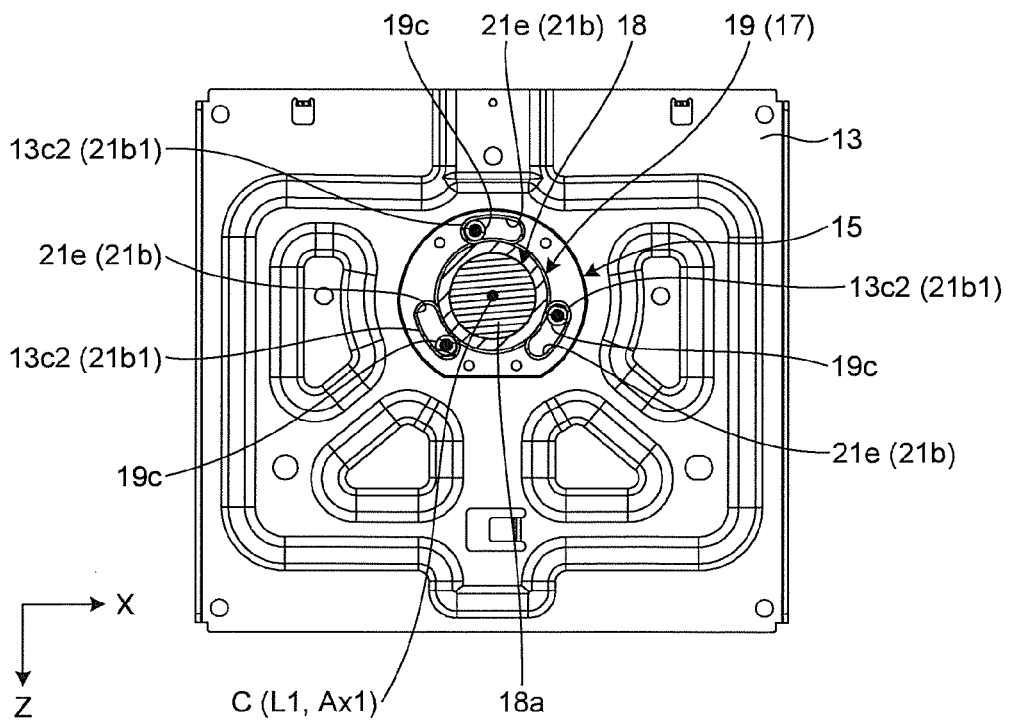
FIG. 18 is an exemplary plan view of part of the support portion of the TV receiver including the cross-section of the protrusion illustrating the state where the first movable portion and the second movable portion are rotated to one side in the first embodiment.
Figure 19:
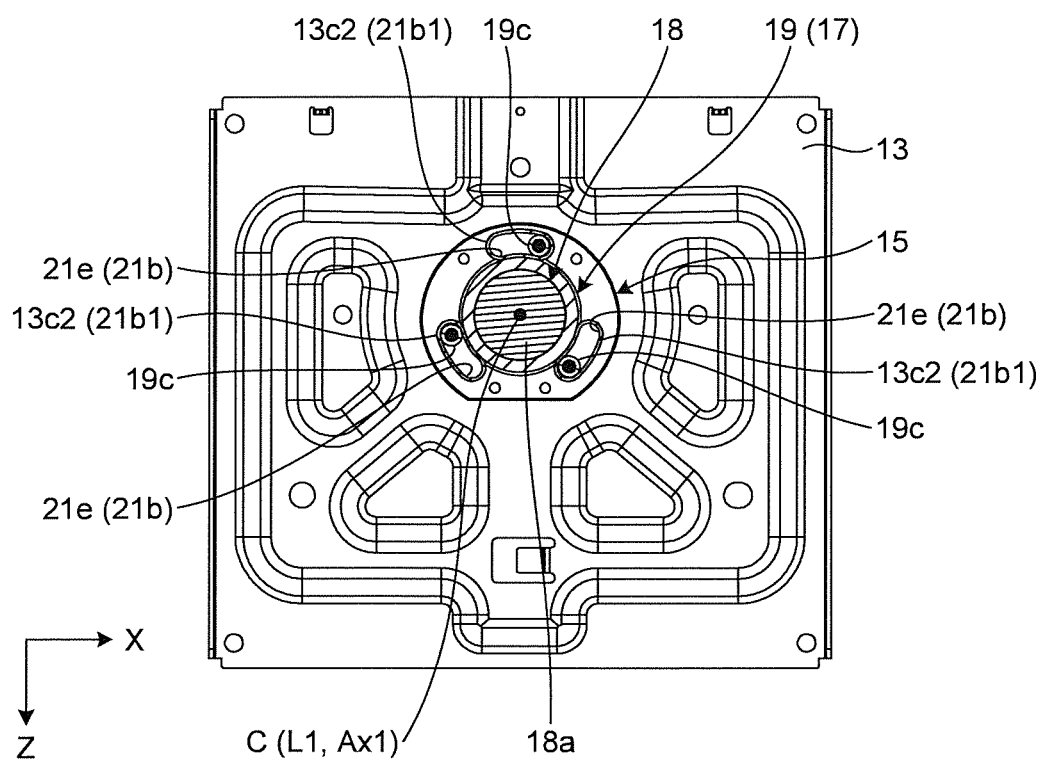
FIG. 19 is an exemplary plan view of part of the support portion of the TV receiver including the cross-section of the protrusion illustrating the state where the first movable portion and the second movable portion are rotated to the other side in the first embodiment.
Figure 20:
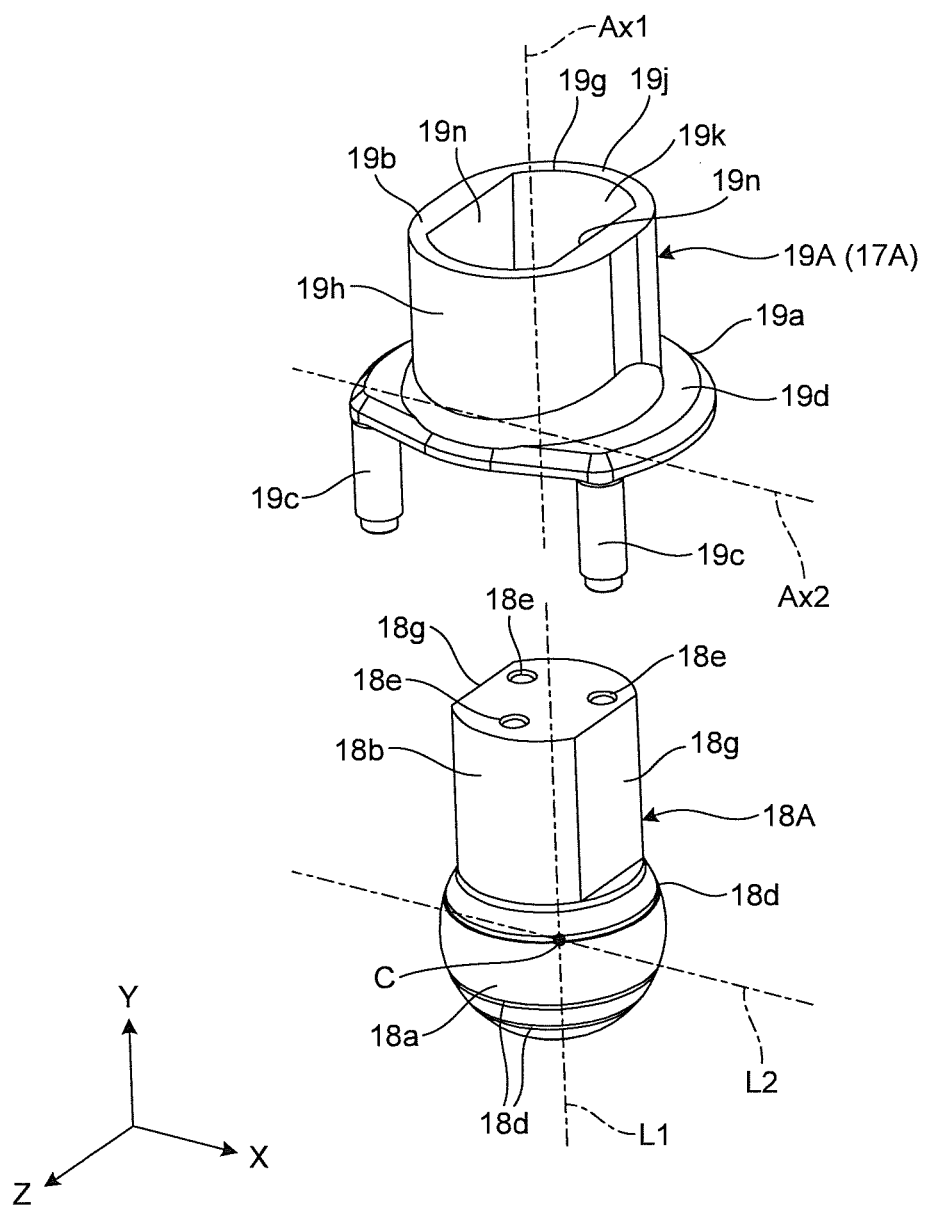
FIG. 20 is an exemplary exploded perspective view of a first movable portion and a second movable portion of a TV receiver according to a modification of the first embodiment.

In the first embodiment, for example, at least one of the engagement (guide) between the spherical portion 18a of the movable portion 18 and the spherical portion 19e (of the first component 19) of the movable portion 17 and the engagement (guide) between the second protrusion 19c (of the first component 19) of the movable portion 17 and the opening 21e of the fourth member 21 (in the first embodiment, for example, both guides) enables the movable portion 17 to rotate about the line L1 (rotation axis Ax1) passing though the center C of the spherical portion 18a. As illustrated in FIGS. 17 to 19, the opening 21e extends along the arc of the center C in the plan view.

In the first embodiment, for example, as illustrated in FIGS. 17 to 19, the rotation range of the movable portion 17 about the line L1 (rotation axis Ax1) is limited by the engagement between the second protrusion 19c and the protrusion 21b as the periphery of the opening 21e. That is, in the first embodiment, the second protrusion 19c is an example of a connection portion and a first engagement portion. In the first embodiment, for example, as illustrated in FIGS. 4 and 5, in the rotation direction of the movable portions 17 and 18 about the line L1 (rotation axis Ax1), the second protrusion 18c of the movable portion 18 engages with the engagement portion 19*f* of the first component 19 of the movable portion 17. Accordingly, the movable portions 17 and 18 rotate in the rotation direction in conjunction with each other. The second protrusion 18*c* is an example of a third engagement portion.

As described above, according to the first embodiment, for example, the movable portion 18, which is an example of a first movable portion, comprises the spherical portion 18*a* and the connection portion 18*e*. The spherical portion 18*a* is an example of a contact portion and a sliding portion supported by the support portion 10 to be rotatable in at least two directions (rotation directions about the rotation axes Ax1 and Ax2). The connection portion 18*e* is connected to the housing 2. The movable portion 17 rotates about the rotation axis Ax1 in conjunction with the movable portion 18 by the engagement between the second protrusion 18*c* and the engagement portion 19*f*. The movable portion 17 comprises the spherical portion 19*e*, the second component 20, and the second protrusion 19*c*. The spherical portion 19*e* is rotatably supported by the support portion 10 as a second sliding portion. The second protrusion 19*c* is an example of a first engagement portion that engages with the support portion 10, thereby limiting the rotation range of the movable portion 18 about the rotation axis Ax1. That is, in the first embodiment, the engagement between the movable portions 17 and 18 limits the rotation range in one direction (in the first embodiment, for example, rotation direction about the line L2 (rotation axis Ax2), second rotation direction). The engagement between the movable portion 17 and the support portion 10 limits the rotation range in another direction (in the first embodiment, for example, rotation direction about the line L1 (rotation axis Ax1), first rotation direction). Thus, according to the first embodiment, for example, the movable portions 17 and 18 can be reliably supported by the fixing portion of the support portion 10 and the rotation range of the movable portions 17 and 18 can be limited in two directions with relatively simple structure. Moreover, for example, the rotation of the movable portions 17 and 18, i.e., the display screen 6*a*, can be limited to two rotation directions, and also the angular range can be set relatively easily with respect to each rotation direction.

According to the first embodiment, for example, the movable portion 18 comprises the second protrusion 18*c* that protrudes along the line L2 (rotation axis Ax2) and engages with the movable portion 17 as a third engagement portion. Thus, according to the first embodiment, for example, even when the movable portion 18 is rotating about the rotation axis Ax2 (in the second rotation direction), the engagement between the second protrusion 18*c* and the engagement portion 19*f*, i.e., the conjunction between the movable portions 17 and 18, is more likely to be maintained.

According to the first embodiment, for example, the movable portion 17 comprises the spherical portion 19*e* as an example of a receiving portion that rotatably supports the spherical portion 18*a* from a different direction than the first member 13 as the fixing portion of the support portion 10 does (in the first embodiment, for example, from above). Thus, according to the first embodiment, for example, the movable portion 17 can be used to support the movable portion 18, which further simplifies the structure.

According to the first embodiment, for example, the movable portion 17 comprises the first component 19 as an example of a first portion, the second component 20 as an example of a second portion, and the second protrusion 19*c* as an example of a connection portion. Thus, according to the first embodiment, for example, the movable portion 17 can be more reliably supported by the fixing portion of the support portion 10. The connection portion may be provided to the second portion or, as a separate part from the first and second portions, may be coupled with the first and second portions to be integrated with the movable portions.

According to the first embodiment, for example, the spherical portion 18*a* of the movable portion 18 is located between the first component 19 of the movable portion 17 and the first member 13 as the fixing portion of the support portion 10. The movable portion 17 comprises the spherical portion 19*e* as an example of a receiving portion that rotatably supports the spherical portion 18*a* from a different direction than the first member 13 as the fixing portion of the support portion 10 (in the first embodiment, for example, from above) does. Besides, there is provided the fourth member 21 having the wall 21*a* as an example of a third sliding portion located between the second component 20 and the first member 13 as the fixing portion of the support portion 10. Thus, according to the first embodiment, for example, the spherical portion 18*a* and the wall 21*a* as sliding portions can be located between the first component 19 and the first member 13 as the fixing portion of the support portion 10 and between the second component 20 and the first member 13, respectively. With this, for example, in the structure in which the first member 13 as the fixing portion of the support portion 10 is located between the first component 19 and the second component 20, the movable portion 17 can rotate more smoothly.

According to the first embodiment, for example, the second protrusion 19*c*, which is an example of a connection portion, passes through the openings 13*c*, 15*d*, and 21*e* in the fixing portion of the support portion 10 and engages with the periphery of the opening 21*e*, thereby functioning as a first engagement portion. Thus, according to the first embodiment, for example, in the structure in which the movable portion 17 is firmly supported by the fixing portion of the support portion 10 by sandwiching the first member 13 as the fixing portion of the support portion 10 between the first component 19 of the movable portion 17 and the second component 20, a mechanism to limit the rotation range can be obtained with a relatively simple structure. In the structure in which the first member 13 as the fixing portion of the support portion 10 is located between the first component 19 and the second component 20, if the first component 19 or the second component 20 engages with the first member 13 as the fixing portion of the support portion 10, the movable portion 17 may be inclined. Regarding this, according to the first embodiment, for example, the second protrusion 19*c* as an example of a connection portion can be used as a first engagement portion. This makes it easier to prevent the movable portion 17 from being inclined.

According to the first embodiment, for example, the fourth member 21 comprises the periphery of the opening 21*e*. Thus, according to the first embodiment, for example, by forming the fourth member 21 with an abrasion-resistant material, it is possible to suppress the abrasion caused by the engagement between the second protrusion 19*c* and the first member 13 as the fixing portion of the support portion 10 (the periphery of the opening 21*e*).

A modification of the first embodiment will be described. The modification is basically similar to the first embodiment except movable portions 17A and 18A and a first component 19A in place of the movable portions 17 and 18 and the first component 19. This modification achieves the same effect as in the first embodiment.

The movable portions 17 and 18 of the first embodiment rotate together (in conjunction with each other) about the rotation axis Ax1 by the engagement between the second protrusion 18*c* and the engagement portion 19*f*. On the other hand, according to the modification, for example, the movable portions 17A and 18A rotate together (in conjunction with each other) by the engagement between surfaces 18g of the first protrusion 18b of the movable portion 18A and surfaces 19n of the opening 19g in the first component 19A of the movable portion 17A. The first protrusion 18b of the movable portion 18A has the two surfaces 18g extending in parallel in a direction in which it protrudes. The opening 19g in the first component 19A has the two surfaces 19n that face the surfaces 18g of the movable portion 18A and extend in parallel to each other. The interval between the two surfaces 18g is about the same as between the two surfaces 19n. In such a structure, for example, the rotation axis Ax2 passes the center C of the spherical portion 18a and is defined as an axis extending in a direction perpendicular to the surfaces 18g and 19n. That is, the surfaces 18g and 19n engage with each other with respect to rotation about the rotation axis Ax1, and therefore the movable portions 17A and 18A rotate together (in conjunction with each other) about the rotation axis Ax1. On the other hand, the surfaces 18g and 19n slide with respect to rotation about the rotation axis Ax2, and therefore the movable portion 18A can slide (rotate, move) against the first component 19A of the movable portion 17A between the positions (angles) where the first protrusion 18b engages with the walls 19h and 19j. According to the modification, for example, the first and second movable portions can be obtained with a relatively simple structure. The surfaces 19n are an example of a first engagement portion, while the walls 19h and 19j are an example of a second engagement portion. This modification is described by way of example only, and the first engagement portion, the second engagement portion, the first movable portion, and the second movable portion can be variously modified.

A second embodiment will be described. The second embodiment is different from the first embodiment and the modification thereof in that the one movable portion 18 (having the same structure as in the first embodiment) is used instead of the movable portions 17 and 18, and there is provided a fifth member 23 that rotatably supports the movable portion 18. The fifth member 23 is an example of part of the fixing portion of a support portion 10B. The second embodiment also achieves the same effect as in the first embodiment.

Figure 21:
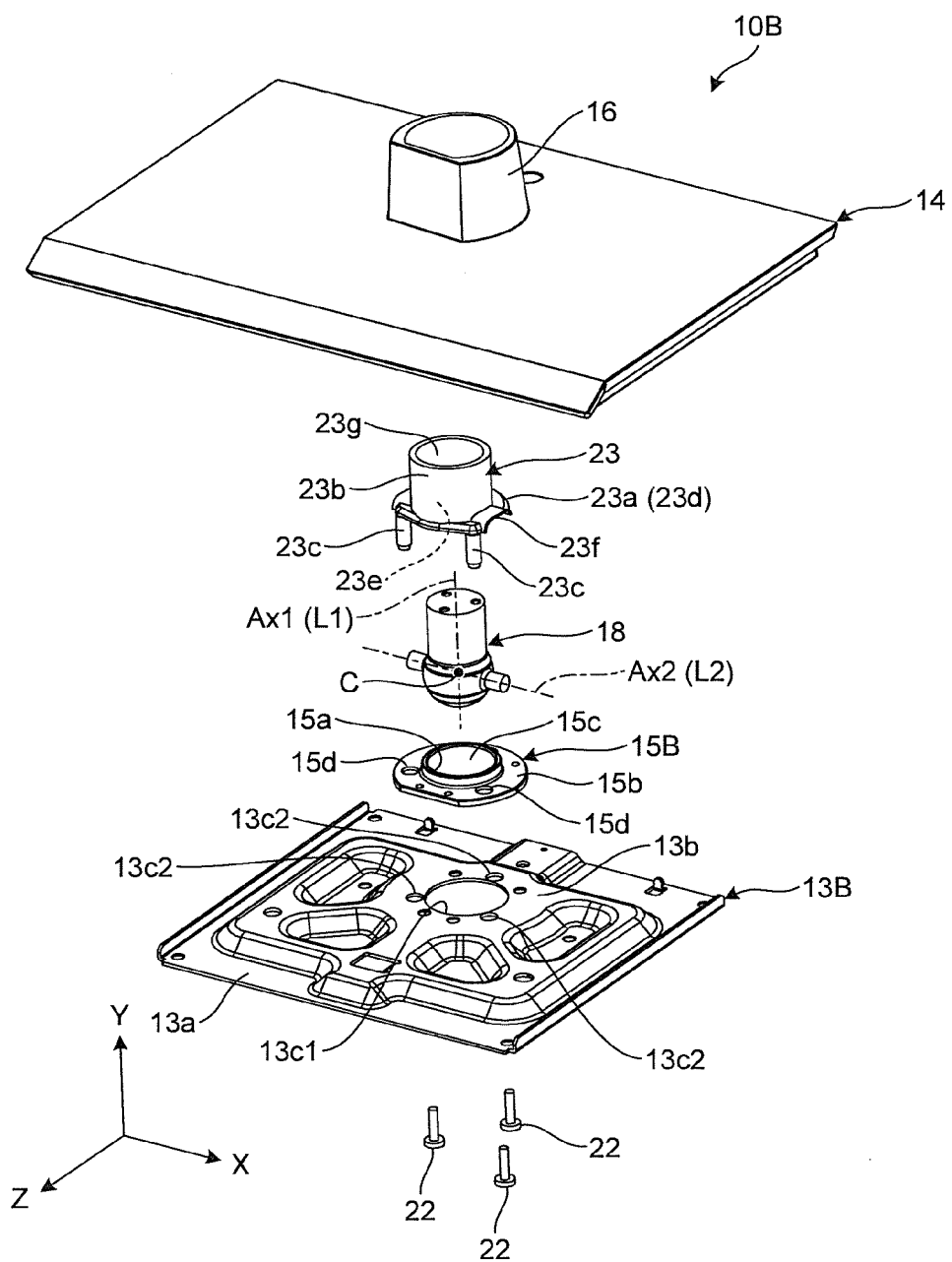
FIG. 21 is an exemplary exploded perspective view of a support portion of a TV receiver according to a second embodiment.

In the second embodiment, for example, as illustrated in FIG. 21, the fifth member 23 comprises a base 23a, a first protrusion 23b, and a second protrusion 23c. The base 23a comprises a wall 23d, a spherical portion 23e, and an engagement portion 23f. The wall 23d is formed in a disc-like (circular ring-like, plate-like) shape. The spherical portion 23e (spherical surface) has the same shape as the spherical portion 19e of the first component 19 of the first embodiment and is provided in the ring of the wall 23d as a partly spherical recess having an opening downward. The wall 23d may be referred to as a flange extending to the outside of the spherical portion 23e. The spherical portion 23e has a spherical inner circumferential surface. The spherical portion 18a as a convex of the movable portion 18 is inserted in the spherical portion 23e as a concave of the fifth member 23. The spherical portion 23e is an example of a support portion that movably supports the spherical portion 18a. Besides, the spherical portion 23e is configured to be in contact with the spherical portion 18a. Namely, the spherical portions 18a and 23e are an example of a contact portion and a sliding portion (bearing). The spherical portion 18a of the movable portion 18 is sandwiched between the spherical portion 23e of the fifth member 23 as fixing portion of the support portion 10B and the spherical portions 15c (the receiving portion 15a) of the third member 15 which are located opposite each other, and is movably supported. The screw 22 as a fastener passing through the second opening 13c2 formed in a first member 13B as a circular through hole is connected to the second protrusion 23c of the fifth member 23. Thus, the fifth member 23 is integrated with the first member 13B. In the second embodiment also, with the tightening torque of the screw 22, the rotation torque of the movable portion 18 as well as the retention of the support portion 10B to support the housing 2 can be set variable. The surface of the spherical portions 18a and 23e (i.e., an example of a contact portion) need not necessarily be a continuous spherical surface, and may be, for example, partly provided with the groove 18d, a slit, a recess, a dimple, a protrusion, or the like. The spherical portions 18a and 23e (i.e., an example of a sliding portion, a contact portion along or on the spherical surface) that are relatively rotatable may be formed of a plurality of divided (split) parts. A lubricant such as grease may be applied between the spherical portion 18a of the movable portion 18 and the spherical portion 23e, i.e., a portion where the spherical portions 18a and 23e slide. In this case, the groove 18d functions as a container of the lubricant. The fifth member 23 may be made of, for example, a synthetic resin material or a metal material (in the first embodiment, for example, metal material). The spherical portion 23e is an example of a receiving portion. The groove 18d may be provided to the spherical portions 15c and 23e. The first protrusion 23b is formed in a cylindrical shape. The first protrusion 23b is provided, in the cylinder, with an opening 23g having a mortar-like inclined surface that tapers down. The first protrusion 23b allows the second protrusion 18c of the movable portion 18 to rotate about the rotation axis Ax1 in a predetermined angle range. The second protrusion 18c can rotate (move) between the engagement portion 23f and the receiving portion 15a of a third member 15B (an end thereof). That is, according to the second embodiment also, the central axis of the second protrusion 18c is the rotation axis Ax2. In the second embodiment, the first protrusion 18b is an example of a second engagement portion, while the second protrusion 18c is an example of a first engagement portion.

According to the second embodiment, by the engagement between the spherical portion 18a and the second protrusion 18c of the movable portion 18 and the receiving portion 15a and the spherical portion 15c of the third member 15B, and the first protrusion 23b, the spherical portion 23e, and the engagement portion 23f of the fifth member 23, the movable portion 18 is supported to be rotatable about the rotation axes Ax1 and Ax2 in a predetermined range with respect to the fifth member 23 and the third member 15B as the fixing portion of the support portion 10B. According to the second embodiment, for example, the support portion 10B can be obtained with a simple structure.

The embodiments is susceptible to various modifications and alternative forms. Further, the embodiments and the modifications may be combined as appropriate. Besides, the specifications (structure, type, direction, shape, size, length, width, thickness, height, number, arrangement, location, material, etc.) of the constituent elements can be suitably modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television receiver comprising:
   a housing configured to house at least part of a display device;
   a support portion configured to support the housing;
   a first movable portion comprising
   a sliding portion supported by one of the housing and the support portion to be rotatable in at least two directions, and
   a connection portion connected to other one of the housing and the support portion;
   a second movable portion configured to rotate in a first rotation direction together with the first movable portion, the second movable portion comprising
   a second sliding portion supported by the one of the housing and the support portion to be rotatable in the first rotation direction,
   a first engagement portion configured to engage with the one of the housing and the support portion to limit a rotation range in the first rotation direction, and
   a second engagement portion configured to engage with the first movable portion and a second rotation direction of the first movable portion to limit a rotation range in the second rotation direction.

2. The television receiver of claim 1, wherein the first movable portion comprises a third engagement portion extending along a rotation axis in the second rotation direction and configured to engage with the second movable portion.

3. The television receiver of claim 1, wherein the second movable portion comprises a receiving portion configured to rotatably support the sliding portion from a different direction than the other one of the housing and the support portion does.

4. The television receiver of claim 1, wherein
   the other one of the housing and the support portion is the support portion,
   the second movable portion comprises a first portion, a second portion, and a connection portion that connects between the first portion and the second portion, and
   the first portion and the second portion sandwich at least part of the support portion.

5. The television receiver of claim 4, wherein
   the sliding portion is located between the first portion and the support portion, and
   the second movable portion comprises a receiving portion configured to rotatably support the sliding portion from opposite side of the support portion,
   the television receiver further comprising a fourth member comprising a third sliding portion located between the second portion and the support portion.

6. The television receiver of claim 5, wherein the connection portion is configured to pass through an opening in the support portion and to engage with a periphery of the opening as the first engagement portion.

7. The television receiver of claim 6, wherein the fourth member comprises the periphery of the opening.

8. The television receiver of claim 1, wherein
   the first rotation direction is a direction of rotation about a vertical axis, and
   the second rotation direction is a direction of rotation about a horizontal axis.

9. A television receiver comprising:
   a housing configured to house at least part of a display device;
   a support portion configured to support the housing; and
   a movable portion comprising
   a sliding portion supported by one of the housing and the support portion to be rotatable in at least two directions,
   a connection portion connected to other one of the housing and the support portion,
   a first engagement portion configured to engage with the one of the housing and the support portion to limit a rotation range in a first rotation direction, and
   a second engagement portion configured to engage with the one of the housing and the support portion to limit a rotation range in a second rotation direction.

10. An electronic device comprising:
    a housing configured to house at least part of a display device;
    a support portion configured to support the housing;
    a first movable portion comprising
    a sliding portion supported by one of the housing and the support portion to be rotatable in at least two directions, and
    a connection portion connected to other one of the housing and the support portion;
    a second movable portion configured to rotate in a first rotation direction together with the first movable portion, the second movable portion comprising
    a second sliding portion supported by the one of the housing and the support portion to be rotatable in the first rotation direction,
    a first engagement portion configured to engage with the one of the housing and the support portion to limit a rotation range in the first rotation direction, and
    a second engagement portion configured to engage with the first movable portion and a second rotation direction of the first movable portion to limit a rotation range in the second rotation direction.

* * * * *